July 3, 1962 R. WINTER 3,042,229
FEED ARRANGEMENT
Filed Sept. 7, 1960
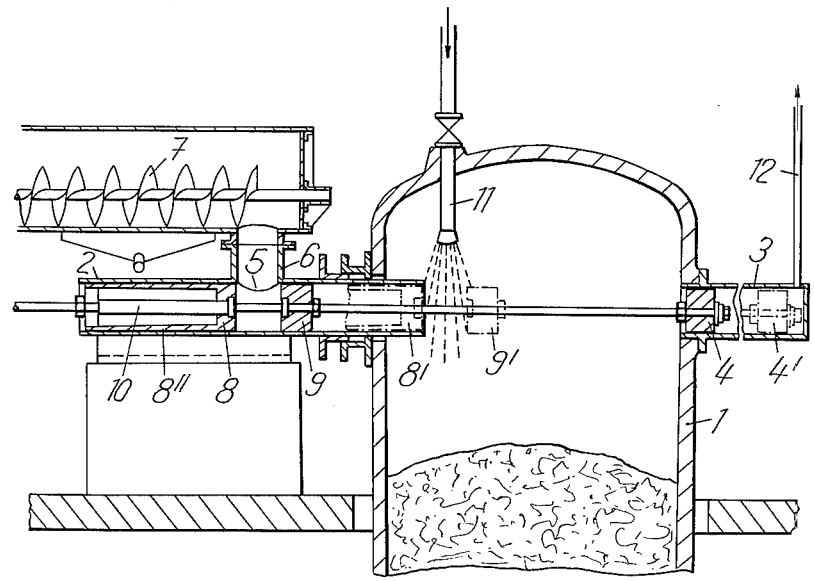
Inventor:
Rudolf Winter
by: George U Spencer
Attorney

United States Patent Office 3,042,229
Patented July 3, 1962

3,042,229
FEED ARRANGEMENT
Rudolf Winter, Duren, Rhineland, Germany, assignor to O. Dörries A.G., Duren, Rhineland, Germany, a firm
Filed Sept. 7, 1960, Ser. No. 54,510
6 Claims. (Cl. 214—17)

The present invention relates to a feed arrangement.

More particularly, the present invention relates to an intermittent feed arrangement by means of which raw pulp or other substance is supplied into a fluid-tight vessel, such as a cooking vat. The substance is fed through a feed cylinder which opens into the vessel and which is in communication with a supply conduit, there being a ram or piston which is slidably arranged in the feed cylinder.

Existing feed arrangements of the above type have the disadvantage that the pressure in the fed cylinder, which is arranged horizontally, is the same as that prevailing in the vessel; this pressure is thus exerted not only on the feed piston but on the entire substance supply system which communicates with the feed cylinder.

It is, therefore, an object of the present invention to provide a feed arrangement for intermittently feeding a substance into a fluid-tight vessel which overcomes the above disadvantages.

It is another object of the present invention to provide an intermittent feed arrangement which operates independently of the pressure prevailing within the fluid-tight vessel.

It is a further object of the invention to provide a feed arrangement which is of rugged construction, which requires few parts, and which will give long periods of trouble-free service.

With the above objects in view, the present invention resides mainly in an apparatus which comprises a feed cylinder communicating at one end thereof with the vessel, a supply conduit communicating with the feed cylinder at a point spaced from this one end, piston means having two pistons slidably arranged in the feed cylinder and mounted for movement in unison with each other between a retracted position and a forward position, the pistons being so spaced from each other that when the piston means is in its retracted position the supply conduit communicates with the space between the pistons and that when the piston means is in its forward position the space communicates with the vessel, and means for equalizing the pressure prevailing interiorly of the vessel and exerted on the piston means.

Additional objects and advantages of the present invention will become apparent upon consideration of the following description when taken in conjunction with the accompanying drawings, in which the single figure is a sectional view of one embodiment of a feed arrangement according to the present invention.

Referring now to the drawing, there is shown a cooking vat or vessel 1 which may be of cylindrical, conical or other suitable shape. Communicating with the interior of the vessel are a feed cylinder 2 whose mouth end projects into the vessel, and a counter-pressure cylinder 3 which is arranged opposite the feed cylinder 2. A counter-pressure piston 4, the purpose of which will be described below, is slidably arranged in the counter-pressure cylinder 3.

The feed cylinder 2 is provided with a filling opening 5 which is spaced from the mouth end of cylinder 2 and is in communication with a preferably vertically oriented supply conduit 6 whose upper end terminates below a feed screw 7 rotatably mounted in a supply chamber. The drive for the feed screw 7 is conventional and therefore not shown, it being clear that upon rotation of the feed screw, raw or impregnated pulp or the like, or other substance, is moved toward the upper end of the supply conduit 6.

Two axially spaced apart feed pistons 8 and 9 are slidably arranged within the feed cylinder 2 and are connected to each other by a common piston rod 10. The spacing between the pistons 8 and 9 is such that when the piston rod 10 is in a retracted position, the pistons will be on opposite sides of the filling opening 5 so that the supply conduit 6 will be in communication with the space between the pistons 8 and 9.

The piston rod 10 extends through the interior of the vessel 1 and into the counter-pressure cylinder 3, where it is connected to the above-mentioned counter-pressure piston 4. This piston 4 is so mounted that when the piston rod 10 is in the retracted position, wherein the supply conduit 6 communicates with the space between the feed pistons 8 and 9, the piston 4 will be approximately flush with the interior of the vessel 1 and thus close to the inner end of the counter-pressure cylinder 3.

The feed cylinder 2 is shown as being open at the left-hand end as viewed in the drawing, i.e., that end which is away from the vessel 1, so that the left-hand end of the piston rod 10 may readily be connected to a suitable actuating mechanism (not shown) by means of which the entire piston means can be reciprocated within the cylinders. It will also be seen that the particular feed piston which is spaced the greater distance from the vessel, namely, the piston 8, is formed with a cylindrical slide portion 8" which extends leftwardly, i.e., away from the vessel 1, so that when the piston means is moved rightwardly, as will be described below, the filling opening 5 is closed.

The counter-pressure cylinder 3 is provided at that end which is directed away from the vessel 1, namely, at the right-hand end as viewed in the drawing, with a vent 12 which is preferably in the form of an upwardly extending vent pipe, so that gases and vapors formed in the right-hand end of the counter-pressure cylinder 3 may escape upon rightward movement of the piston means.

Also shown is a conduit 11 through which a washing or leaching solution or other fluid may be played onto the substance being fed into the interior of the vessel 1 through the mouth of the feed cylinder 2.

The operation of the apparatus is as follows:

With the pistons 4, 8 and 9 of the piston means occupying the retracted position shown in solid lines, the space between the pistons 8 and 9 is in alignment with the filling opening 5 and, therefore, in communication with the supply conduit 6, so that material being moved by the feed screw 7 is introduced into the space between the pistons 8 and 9. When this space is filled, the piston means is moved rightwardly into a forward position shown in dotted lines, the positions of the individual pistons now being indicated by 4', 8' and 9', wherein the face of the piston 8 is approximately flush with the mouth of the feed cylinder 2 so as to close the same. In this forward position, the space between the pistons 8 and 9 will be interiorly of the vessel 1 so that the material originally lodged between the faces opposite of the pistons 8 and 9 will have fallen into the vessel 1. During this feeding process, a suitable liquid may be played onto the substance by way of the conduit 11, thereby wetting the substance and flushing it out of the space between the faces of the pistons 8, 9. The piston means is then returned to its retracted position, shown in solid lines.

It will be noted that throughout the entire operation, the pressure prevailing within the vessel 1 will act not only on one of the feed pistons 8, 9, but also on the counter-pressure piston 4. Inasmuch as these pistons have the same effective cross-sectional areas, the pressure acting on the piston means as a whole is equalized so that the operation of the piston means, i.e., the reciprocation of the pistons, can be carried out without being influenced by the actual pressure prevailing within the vessel 1. Furthermore, the two feed pistons 8, 9 will prevent the pressure prevailing within the vessel 1 from acting on the substance being fed so long as it is still outside the vessel, so that the feed path leading to the space between the pistons 8, 9 is not subjected to the pressure within the vessel.

It will be understood that the above description of the present invention is susceptible to various modifications, changes and adaptations, and the same are intended to be comprehended within the meaning and range of equivalents of the appended claims.

I claim:

1. In an apparatus for intermittently feeding a substance into a fluid-tight vessel, the combination which comprises: a first cylinder communicating with said vessel; a supply conduit communicating with said first cylinder; first and second spaced apart pistons slidably arranged in said first cylinder; connecting means connecting said first and second pistons to each other for movement in unison and maintaining said pistons in such spaced apart relationship that in one position of said two pistons the space between them communicates with said supply conduit; a second cylinder communicating with said vessel and arranged opposite said first cylinder; and a third piston slidably arranged within said second cylinder, said third piston being connected to said connecting means so as to be movable with said first and second pistons in unison therewith.

2. In an apparatus for intermittently feeding a substance into a fluid-tight vessel, the combination which comprises: a first cylinder communicating at one end thereof with said vessel; a supply conduit communicating with said first cylinder at a point spaced from said one end; first and second spaced apart pistons slidably arranged in said first cylinder; a common piston rod connected to said first and second pistons for moving the same in unison; a second cylinder communicating at one end thereof with said vessel, said second cylinder being arranged opposite said first cylinder; and a third piston slidably arranged within said second cylinder and also connected to said piston rod, said pistons being so spaced from each other that in one position of said piston rod, said supply conduit communicates with the space between said first and second pistons and said third piston closes said one end of said second cylinder.

3. The combination defined in claim 2 wherein said one position of said piston rod is a retracted position from which said piston rod is movable forwardly into a forward position wherein said space between said first and second pistons communicates with the interior of said vessel, during which forward movement said first piston moves from said one point of said first cylinder toward said one end thereof, said first piston being formed with a circular slide for closing said supply conduit during said forward movement.

4. The combination defined in claim 2 wherein the second cylinder at its other end is vented.

5. The combination defined in claim 2, wherein said one end of said cylinder forms a mouth which projects into the interior of said vessel, and wherein conduit means are provided for supplying a fluid onto the substance being fed into the interior of said vessel through said mouth.

6. In an apparatus for intermittently feeding a substance into a fluid-tight vessel, the combination which comprises: a feed cylinder one end of which extends into the interior of said vessel; a supply conduit communicating with said feed cylinder at a point thereof spaced from said one end; a counter-pressure cylinder communicating at one end thereof with said vessel, said counter-pressure cylinder being arranged opposite said feed cylinder; and pressure-compensated piston means slidably arranged within said cylinders and being movable between a retracted position and a forward position, said piston means comprising axially spaced apart first and second feed pistons slidably arranged in said feed cylinder, a counter-pressure piston slidably arranged in said counter-pressure cylinder, and a piston rod connecting all of said pistons to each other for movement in unison, said pistons being so spaced from each other that when said piston means is in said retracted position thereof, said first and second pistons are on opposite sides of said point at which said supply conduit communicates with said feed cylinder and said counter-pressure piston closes said one end of said counter-pressure cylinder, and that when said piston means is in said forward position thereof, the space between said feed pistons is beyond said one end of said feed cylinder and in communication with the interior of said vessel, whereby the pressure prevailing within said vessel is equally effective on said feed pistons as on said counter-pressure piston, and whereby the interior of said vessel is always maintained out of communication from the interior of said supply conduit.

References Cited in the file of this patent
UNITED STATES PATENTS

| 1,974,789 | Angell | Sept. 25, 1934 |
| 2,831,587 | Rearick | Apr. 22, 1958 |

FOREIGN PATENTS

| 699,747 | Great Britain | Nov. 18, 1953 |